(12) United States Patent
Naven et al.

(10) Patent No.: US 8,160,086 B2
(45) Date of Patent: Apr. 17, 2012

(54) DATA SWITCH

(75) Inventors: Finbar Naven, Cheshire (GB); John Roger Drewry, Cheshire (GB)

(73) Assignee: VirtenSys Limited, Cheshire (GB)

( * ) Notice: Subject to any disclaimer, the term of this patent is extended or adjusted under 35 U.S.C. 154(b) by 310 days.

(21) Appl. No.: 12/250,994

(22) Filed: Oct. 14, 2008

(65) Prior Publication Data

US 2009/0103556 A1    Apr. 23, 2009

Related U.S. Application Data

(60) Provisional application No. 60/983,396, filed on Oct. 29, 2007.

(30) Foreign Application Priority Data

Oct. 16, 2007    (GB) .................................. 0720148.6

(51) Int. Cl.
*H04L 12/56*    (2006.01)

(52) U.S. Cl. ........................................ 370/413; 370/503

(58) Field of Classification Search ........................ None
See application file for complete search history.

(56) References Cited

U.S. PATENT DOCUMENTS

| | | | |
|---|---|---|---|
| 5,081,645 A | | 1/1992 | Resnikoff et al. |
| 6,654,370 B1 * | | 11/2003 | Quirke et al. ................. 370/389 |
| 6,937,568 B1 * | | 8/2005 | Nicholl et al. ................ 370/236 |
| 2002/0041650 A1 | | 4/2002 | Richmond |
| 2003/0163748 A1 * | | 8/2003 | Calkins et al. ................ 713/500 |
| 2004/0210687 A1 * | | 10/2004 | Mann .............................. 710/52 |
| 2006/0092969 A1 * | | 5/2006 | Susnow et al. ................ 370/465 |
| 2006/0109929 A1 * | | 5/2006 | Tripathi ........................ 375/272 |
| 2007/0110142 A1 * | | 5/2007 | Sartore et al. ................ 375/219 |

FOREIGN PATENT DOCUMENTS

WO    2007/039107 A1    4/2007

OTHER PUBLICATIONS

International Search Report and Written Opinion for corresponding PCT Application No. PCT/GB08/050907 dated Jun. 7, 2009, (12 pages).

* cited by examiner

*Primary Examiner* — Chirag Shah
*Assistant Examiner* — Daniel Mitchell
(74) *Attorney, Agent, or Firm* — Shumaker & Sieffert, P.A.

(57) ABSTRACT

A data switch for an integrated circuit comprising at least one link for receiving input data packets from an independently modulated spread spectrum clock (SSC) enabled source having predetermined spread spectrum link clock frequency characteristics, and at least one output for transmitting the data packets after passage through the switch, the switch further comprising at least one receive buffer having a link side and a core side for receiving the SSC modulated input data packets from the link, at least one transmit buffer and a core clock, wherein the core clock operates at a given frequency between predetermined error limits determined by oscillation accuracy alone and is not SSC-enabled, the core clock frequency being set at a level at least as high as the highest link clock frequency such that the receive buffer cannot be filled faster from its link side than it can be emptied from its core side.

24 Claims, 1 Drawing Sheet

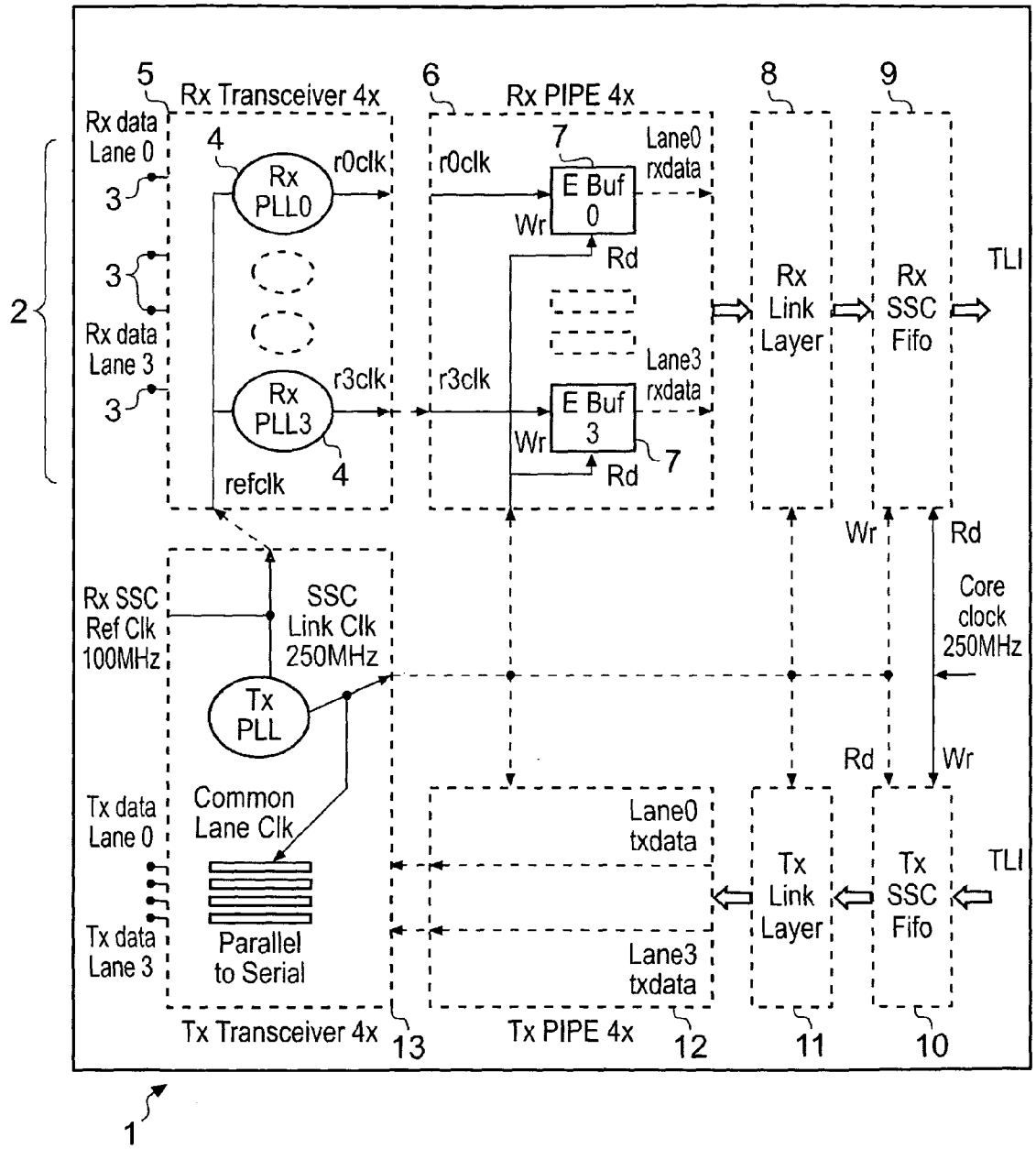

DATA SWITCH

This Application claims the benefit of U.S. Provisional Application No. 60/983,396, filed Oct. 29, 2007, and U.K. Patent Application No. GB 0720148.6, filed Oct. 16, 2007, the contents of which are hereby incorporated by reference in their entirety.

TECHNICAL FIELD

This invention is primarily concerned with the provision of a device such as a data switch, and more specifically to a data switch for managing data emanating from at least one source having an independently-modulated spread-spectrum clock (SSC), and in some embodiments at least two sources having independent SSCs.

BACKGROUND

Spread-spectrum clock (SSC) generation is used in the design of synchronous digital systems, especially those containing microprocessors, to reduce the spectral density of the electromagnetic interference (EMI) that these systems generate. A synchronous digital system is one that has an infinite spectral density. Practical synchronous digital systems radiate electromagnetic energy on a number of narrow bands spread on the clock frequency and its harmonics, resulting in a frequency spectrum that, at certain frequencies, can exceed the regulatory limits for electromagnetic interference.

To avoid this problem, spread-spectrum clocking is used. This consists of using one or a combination of a variety of spread spectrum techniques, such as modulating the clock frequency in a cyclic manner in order to reduce the peak radiated energy. The technique therefore reshapes the electromagnetic emissions of the system to comply with relevant electromagnetic compatibility (EMC) regulations.

Many modern computer servers use SSC to deliver data both over internal and external bus architectures, examples of such architectures being PCI (Peripheral Component Interconnect), PCI-X, and PCI Express. PCI Express is a bi-directional serial I/O interconnect standard that carries data in packets along two or more pairs of point-to-point data lanes, all of which constitute a link. Serial bit rates for PCI Express are 2.5 Gb/s or 5.0 Gb/s per lane direction.

One of the known difficulties with switches receiving data from multiple sources is that currently many such switches are incapable of processing traffic received by the switch from sources not having the same modulated SSC. Furthermore, even if data delivered to the switch emanates from different sources having the same modulated SSC, the switch itself would also need the same SSC signal to process the traffic effectively, reliably and accurately.

For example, in current PCI Express switch implementations, independent devices connected by a link operate within a clock domain, controlled by a crystal with a defined accuracy (eg +/−300 ppm, this being typical for current applications). The maximum frequency difference between any clock, i.e. the clocks of the one or more devices from where the data emanate, and the switch clock, is therefore 600 ppm. The difference in clock speeds between the device(s) and the switch therefore necessitates that the switch be provided with a means for accommodating or adjusting the clock rate of the received data, and to this effect, elastic buffers (e.g. first in, first out or FIFO buffers) exist at the receiving end of a link to counteract the clock frequency differences. The elastic buffer is configured to keep a read pointer (relating to amount of data received by the switch) and a write pointer (relating to an amount of data to be written to the buffer) within predetermined distances from each other so as to ensure that the buffer does not inadvertently at any point overflow (if the rate of reading data is lower than the rate of writing data for more than a certain time) or become empty (if the rate of writing data is lower than the rate of reading data for more than a certain time). Overflowing or running empty can cause data packets to become broken during passage through the switch, which leads to data corruption and generation of errors. The elastic buffer mechanism may, for example, add or discard predetermined redundant or junk data to balance the data rates across the link. The elastic buffer is large enough to accommodate the maximum frequency difference between the clocks, but this strategy unavoidably causes a small amount of latency to be added to the link.

In the case of SSC data delivery, although the data delivered may be identical, the frequency spectrum over which such is delivered can be much broader (for example a range of 5000 ppm modulated at a pulse-to-pulse frequency of 30 kHz), so instead of data being received at a particular clock frequency being ±300 ppm different to the clock frequency of the switch, the difference in the delivery rate of data from an SSC source can typically be anything up to ±300 ppm with an additional ±5000 ppm if both link partners have an independent SSC modulation This assumes a typical PCI Express application in which a clock signal is capable of being modulated in an SSC fashion so as to have a frequency of from +0% to −0.5% of a nominal unmodulated clock frequency of, say, 2.5 GHz. In other words, the SSC modulation is added to the ±300 ppm inaccuracy of the crystal generating the nominal signal clock, leading to a maximum relative clock frequency spread of ±5600 ppm. The provision of means whereby redundant data could be added or discarded from a bitstream to compensate for such differences is not only impractical in terms of link efficiency and elastic buffer FIFO size constraints, but would also impose an unacceptable degree of latency between the source of the data and its destination (i.e. a factor of 10 worse than the non-SSC scenario). The elastic buffer strategy cannot simply be scaled up to cope with SSC.

SUMMARY

Embodiments of the present invention seek to enable each processor (i.e. server) link in a switch to operate using individual and unrelated Spread Spectrum Clock (SSC) domains, without imposing excessive latency on processing the link traffic.

Embodiments of the invention further seek to provide an SSC-capable switch, and a method of compensating for SSC data received from sources having independent SSCs.

Although this invention is perhaps most applicable to the PCI Express interface and other serial data transfer means, it will be immediately appreciated that its application is not limited thereto. Indeed, embodiments of the invention should be considered as applicable to any high-speed serial switch means which is required to process data from sources which may have independent SSCs.

According to a first aspect of the present invention, there is provided a data switch for an integrated circuit comprising at least one link for receiving input data packets from an independently modulated spread spectrum clock (SSC) enabled source having predetermined spread spectrum link clock frequency characteristics, and at least one output for transmitting the data packets after passage through the switch, the switch further comprising at least one receive buffer having a link side and a core side for receiving the SSC modulated input data packets from the link, at least one transmit buffer and a core clock, wherein the core clock operates at a given frequency between predetermined error limits determined by oscillation accuracy alone and is not SSC-enabled, the core clock frequency being set at a level at least as high as the highest link clock frequency such that the receive buffer cannot be filled faster from its link side than it can be emptied from its core side.

According to a second aspect of the present invention, there is provided a method of data switching for an integrated circuit comprising at least one link for receiving input data packets from an independently modulated spread spectrum clock (SSC) enabled source having predetermined spread spectrum link clock frequency characteristics, and at least one output for transmitting the data packets after passage through the switch, wherein SSC modulated input data packets are received from the link in at least one receive buffer having a link side and a core side, and wherein a core clock operates at a given frequency between predetermined error limits determined by oscillation accuracy alone and is not SSC-enabled, the core clock frequency being set at a level at least as high as the highest link clock frequency such that the receive buffer cannot be filled faster from its link side that it can be emptied from its core side.

Advantageously, the receive buffer is configured to detect packet boundaries and to delay initiating a core-side read operation until a sufficient portion of a data packet has been written to the receive buffer so as to ensure that the end of the data packet will have been received in the receive buffer by the time the core is ready to read to end of the data packet.

The delay may be set at a predetermined, fixed value, preferably at a value giving minimum latency.

The switch may further comprise a controller to dynamically adjust the delay in accordance with a detected packet size and/or an instantaneous frequency difference between the source clock and the core clock, the delay advantageously being adjusted to give minimum latency.

The switch may further comprise a timer to initiate the core-side read operation a predetermined time after a packet has been received.

A receive link layer may be situated on the link side of the receive buffer.

The link may comprise a single lane link, and the link layer may serve to detect packet boundaries.

Alternatively, the link may comprise a multi-lane link, and the link layer may be configured to align bytes of a data packet distributed across the lanes and serve to detect packet boundaries.

In preferred embodiments, the link layer has a link side and a core side, and a boundary between the link clock domain and the core clock domain is located between the core side of the link layer and the core.side of the receive buffer.

In other preferred embodiments, a boundary between the link clock domain and the core clock domain is located between the link.side of the receive buffer and the core side of the receive buffer.

The term "oscillation accuracy" is intended to refer to whatever is generating the relevant clock signal, which may, for example, be a crystal or the like.

Where, for example, the receive buffer is configured as an SSC FIFO in a typical PCI Express application, ensuring that the switch core clock operates at the stated frequency means that the receive buffer cannot be filled faster than the switch core clock can empty it, since the source clock can only be equal to, or up to (for example) −5600 ppm slower than, the core clock. This helps to prevent data over-run.

Preferably, the receive buffer is configured to detect data packet boundaries (this may alternatively be done by an additional link layer provided on the link side of the receive buffer) and to delay initiating a core-side read operation until a sufficient portion of a data packet has been written to the receive buffer so as to ensure that the end of the data packet will have been received in the receive buffer by the time the core is ready to read to end of the data packet. This helps to prevent data under-run, where the switch core reads data faster than it can be written to the receive buffer. The delay in initiation will depend on the source clock frequency at any given time, which may, for example, be up to 5600 ppm less than that of the core clock.

Data packets can be large (for example up to 4096 bytes) or small (for example 32 bytes), and therefore require different amounts of time to be fully received. Accordingly, the delayed read mechanism for the receive buffer must always postpone a read operation until a sufficient amount of data has been received to avoid an under-run situation where the packet might be a large packet. The size of the delay may be fixed, or may be fine tuned to reflect the size of an individual packet or an instantaneous frequency difference between the source or link clock(s) and the core clock. The delayed read mechanism is, in effect, a watermark mechanism, where the received data must equal or exceed a given watermark value before reads can be triggered. To allow for situations in which a received data packet is actually smaller than the watermark value (which would never be reached if the small received packet was the only packet to be received), a timer may advantageously be provided. The timer is started upon reception of the data packet, and causes a read to be triggered after a given time, the given time being determined by the time it would take to reach the watermark level had a larger packet been received.

In most typical situations, data packets are not transmitted from a source in simple serial form along a single lane within a link, but instead are spread across multiple lanes operating in parallel within a link. Because of the inherent clock phase variation between lanes, bits of a data packet travelling along multiple lanes can get out of step with each other. In switches having multi-lane links, therefore, it is necessary for each lane to be provided with an independent elastic buffer to compensate for this variation in clock phase. It is possible to do this by inserting or deleting redundant data to or from any one of the multiple lanes, and each lane can dynamically perform this function on either the same clock cycle, or plus/minus one clock cycle relative to each other. However, this relative lane shuffling makes it extremely difficult to detect a packet boundary before the data has been aligned across all of the lanes in a link. In turn, this means that the receive buffer cannot be placed between the independent elastic buffers and the link layer which performs the lane alignment. Therefore, the present applicants have determined that the receive buffer should be placed between the link layer and the Transaction Layer Interface (TLI, the boundary between the link or source clock and the core clock), with the link layer being operated in the link or source clock domain. In other words, the receive buffer should be placed between the link layer and the core (at the TLI) with the link layer being operated in the link or source clock domain, rather than in the core clock domain as would be appropriate if the SSC mechanism was not supported (i.e. the asynchronous clock boundary between the link and core clocks is moved, in embodiments of the present invention, from the lane elastic buffers to the SSC buffer).

Elastic buffers typically consist of a circular FIFO, where the read and write addresses are dynamically adjusted (when redundant data is received) so as to maintain or restore a separation equivalent to the amount of additional data that might be received or read due to the ±300 ppm clock frequency difference. The size of the elastic FIFO buffer should be approximately equivalent to twice the amount of data in the buffer so that the read and write addresses do not close in on each other during the periods between adjustments. The separation of the read and write addresses introduces latency or delay between writes and reads. This is why it is not sufficient for the receive buffer of embodiments of the present invention simply to be a scaled up equivalent to this elastic buffer mechanism, since the latency will quickly become unacceptable, and size constraints will be breached.

In order for the switch to transmit data, for example to a link partner, the data supplied from the core is written into the transmit buffer. The situation here is much simpler than on the receive side, and a standard FIFO mechanism can be used across the TLI clock boundary. This is because the link or destination SSC clock will always be equal to or slower than the core clock (because the core clock in the present invention is not SSC capable, and can therefore never run at, say, −5000 ppm relative to the link clock), and the transmit buffer can therefore not under-run. The transmit buffer may be protected from over-run situations by way of a standard fill level detection mechanism, causing the core to suspend writing to the transmit buffer until space becomes available. The standard transmit side link layer does not contain, or need to contain, elastic buffers, and is in effect a means for converting parallel core data to serial link data.

Exemplary features of embodiments of the present invention include:

i) The receive buffer is configured to detect packet boundaries ii) The receive buffer prevents under-run while reducing latency iii) The receive buffer is not simply a scaled-up version of a standard elastic buffer, since this would result in unacceptable physical size and latency iv) The core clock is not SSC capable, but operates at a relatively fixed speed (subject to the inherent variations in crystal accuracy, e.g. ±300 ppm), thereby preventing over-run v) The link/core clock boundary is moved further into the switch, from the elastic buffer (where provided) to the core end of the link layer.

In a further aspect of the present invention, there is provided a switch comprising at least one link receiving input comprising one or more discrete conductors along which serial data in a plurality of lanes within the link is delivered into and through said switch, at least one transmitting output to the core on which deserialized data is delivered, said switch further comprising:

data deserialising means, link clock signal recovery means, elastic buffer means for discarding or adding redundant data bits independently to each of the lanes, and a link layer incorporating lane alignment means for ensuring that the data in each of said lanes is aligned in a parallel manner across the lanes prior to passing the parallel data to the switch core;

wherein said switch also includes:

a receive FIFO buffer disposed after the link layer in terms of the data delivery direction, said FIFO buffer having fill-level detection means and packet boundary detection means which together prevent the offer of data on the said at least one output if the fill-level of the FIFO buffer cannot support data flow on said at least one output for at least one or more data packets.

This aspect of the present invention is of particular relevance to PCI Express implementations, in which multiple link lanes, elastic buffers and link layers are standard.

Preferably, the writing of data in and reading of data from the elastic buffer means is conducted according to the recovered link clock signal.

Most preferably, the switch further comprises a core clock which is not itself allowed to operate as an SSC clock according to which data is read from the FIFO buffer, said data having been written thereto according to the recovered link SSC clock signal.

Yet further preferably, the switch includes at least one data receiving input to which parallel data may be delivered, a further transmit FIFO buffer, a further transmit link layer, data serialising means and transmit link clock frequency generation means which delivers serialized data through at least one serial data transmission output, said link clock frequency generation means deriving the link clock frequency by virtue of an input from the link clock recovery means.

The data serialisation and deserialisation, and link clock signal recovery and generation may be performed by means of an appropriate transceiver module, which may be any suitable module for serialising/deserialising data, these modules being commonly available from various suppliers.

Elastic buffers may be provided for each of the lanes comprised within any particular link.

Yet further preferably, the FIFO buffer clock domains are asynchronous.

As will be appreciated from the above, embodiments of the invention involve the moving of the switch core clock domain further into the device, and utilising the recovered link clock signal for the entire link layer. In a particularly advantageous embodiment, the core clock is used only to conduct read operations on the receive FIFO buffer disposed prior to the parallel data input to the core, and to conduct write operations into the transmit FIFO buffer disposed proximate the serialized data receiving input of said switch. It is important to appreciate that it is the core clock, not the link clock, that runs the receive FIFO buffer, the transmit FIFO buffer and the other transmit elements.

Analogously, the recovered link clock signal is used to operate all the link layer logic between the original elastic buffer means and the new core clock boundary.

For example, in a conventional switch, write operations within the elastic buffer means (when serialized data is being received at the serial data input, and converted to deserialized data for delivery at the corresponding output) would be conducted according to the recovered link clock signal, but read operations would be conducted according to the core clock. In embodiments of the present invention, both read and write operations are conducted according to the recovered link clock signal, and thus the change in clock periodicity of the data is not conducted until after the lane alignment has been performed by the link layer, which is a complex process due to the need to detect packet boundaries.

In simpler terms, the insertion of an asynchronous FIFO at the transaction layer boundary is desirable because this precludes modifications to the link layer. The FIFO read clock domain, being the switch core clock domain which is common to all links, is not spread-spectrum modulated, and therefore said FIFO cannot over-run. Even when the FIFO buffer under-runs, embodiments of the invention ensures that such occurs only at packet boundaries.

By virtue of the above, all links can have independent SSCs.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

BRIEF DESCRIPTION OF DRAWINGS

FIG. 1 is a block diagram of a schematic layout for a switch port attached to a link according to one embodiment of the present invention.

DETAILED DESCRIPTION

Referring to FIG. 1, there is shown a switch port generally indicated at 1 which has at least one serial data input link 2 divided into a plurality of receive lanes 3, which feed individual lane phase locked loop PLL0-PLL3 clock recovery circuits 4 locked to a link SSC reference clock. The circuits 4 may be incorporated into a receive transceiver module 5.

The module 5 serves to deserialize the received data, and then passes the data on to a receive PIPE module 6 comprising a plurality of elastic buffers 7, one for each lane (lane 0 to lane 3). The PIPE module 6 serves to recover drift between the lanes 3. For each elastic buffer 7, the write pointer Wr and the read pointer Rd are kept within predetermined limits of each other so as to help avoid over-flow or under-run. This technique is known in the art, and will not be described in detail.

It will be understood that modules 5 and 6 need not be incorporated within the structure of the switch of embodiments of the present invention, but may be located off-chip.

The deserialized data is then passed from module 6 to receive link layer 8 where the received data is properly aligned across the lanes 3. The lane alignment can be achieved by padding one or more lanes with redundant bits and/or cutting unnecessary bits from one or more lanes.

All of the above is conducted in the link clock domain.

Parallel data properly aligned between the lanes 3 is then passed from the receive link layer, operating in the link clock domain, to a receive FIFO buffer 9. A link/core clock boundary is located in the receive FIFO buffer 9, such that its input operates in the link clock domain and its output operates in the core clock domain (e.g. 250 MHz, not SSC-enabled). Relocation of the link/core clock boundary or interface to this position is a key aspect of preferred embodiments of the present invention. It will be appreciated that packet boundaries can be easily detected only after the lane alignment process.

The receive FIFO buffer 9 is provided with a watermark mechanism whereby the received data must equal or exceed a given watermark value before reads towards the core can be triggered. This prevents the buffer 9 from running empty and thus causing breaks in the packets. Preferably, the buffer 9 further includes a timer which causes a read to be triggered after a predetermined time if the watermark is not reached. This ensures that small packets (which are not large enough to fill the buffer 9 to the watermark level) are read.

On the transmit side of the core, there is provided a transmit FIFO buffer 10, which passes transmit data across the clock boundary on to a transmit link layer 11, which in turn passes the transmit data through a transmit PIPE module 12 to a transmit transceiver module 13. Because the transmit data is ultimately modulated to the core clock, which is not SSC-enabled, the transmit process is much simpler than the receive process, since it is not necessary to compensate for SSC frequency/phase variations in the clock signal.

Various embodiments of the invention have been described. These and other embodiments are within the scope of the following claims.

The invention claimed is:

1. A data switch for an integrated circuit, comprising:
a link to receive input data packets from an independently modulated spread spectrum clock (SSC) enabled source, wherein the source has predetermined spread spectrum link clock frequency characteristics;
an output to transmit the data packets after passage through the switch;
a receive buffer, having a link side and a core side, to receive the SSC modulated input data packets from the link;
a transmit buffer to buffer the data packets for the output; and
a core clock that operates at a given frequency between predetermined error limits determined by oscillation accuracy alone, wherein the core clock is not SSC-enabled, wherein the frequency is set at a level at least as high as the highest link clock frequency such that the receive buffer cannot be filled faster from its link side than it can be emptied from its core side.

2. The switch of claim 1, wherein the receive buffer detects packet boundaries and delays initiating a core-side read operation for a delay period, wherein the delay period causes the receive buffer to delay initiating the core-side read operation until a sufficient portion of a data packet has been written to the receive buffer so as to ensure that the end of the data packet will have been received in the receive buffer by the time the core is ready to read the end of the data packet.

3. The switch of claim 2, wherein the delay period is a predetermined, fixed value.

4. The switch of claim 2, wherein the delay period is a value giving minimum latency.

5. The switch of claim 2, further comprising a controller to dynamically adjust the delay period in accordance with a detected packet size and an instantaneous frequency difference between the source clock and the core clock.

6. The switch of claim 5, wherein the controller adjusts the delay period minimize latency.

7. The switch of claim 2, further comprising a timer to initiate the core-side read operation at a predetermined time after a packet has been received.

8. The switch of claim 1, further comprising a receive link layer situated on the link side of the receive buffer.

9. The switch of claim 8, wherein the link comprises a single lane link and wherein the receive link layer detects packet boundaries.

10. The switch of claim 8, wherein the link comprises a multi-lane link and wherein the link layer aligns bytes of a data packet distributed across the lanes and detects packet boundaries.

11. The switch of claim 8, wherein the link layer has a link side and a core side, and wherein a boundary between a link clock domain and a core clock domain is located between the core side of the link layer and the core side of the receive buffer.

12. The switch of claim 1, wherein a boundary between a link clock domain and a core clock domain is located between the link side of the receive buffer and the core side of the receive buffer.

13. A method of data switching for an integrated circuit comprising:
   receiving spread spectrum clock (SSC) modulated input data packets with a receive buffer, having a link side and a core side, of a link for receiving input data packets from an independently modulated SSC enabled source, having predetermined spread spectrum link clock frequency characteristics, of a switch;
   determining a clock frequency between predetermined error limits determined by oscillation accuracy alone at a level at least as high as a highest link clock frequency such that the receive buffer cannot be filled faster from its link side that it can be emptied from its core side;
   operating a core clock that is not SSC-enabled at the determined clock frequency; and
   transmitting the data packets after passage through the switch.

14. The method of claim 13, further comprising detecting, with the receive buffer, packet boundaries;
   determining a delay that will allow a sufficient portion of a data packet to be written to the receive buffer so as to ensure that the end of the data packet will have been received in the receive buffer by the time the core is ready to read to end of the data packet; and
   delaying initiation of a core-side read operation in accordance with the delay.

15. The method of claim 14, wherein determining a delay comprises setting the delay to a predetermined, fixed value.

16. The method of claim 14, wherein determining a delay comprises setting the delay to a value giving minimum latency.

17. The method of claim 14, wherein determining a delay comprises dynamically adjusting the delay with a controller in accordance with a detected packet size and an instantaneous frequency difference between the source clock and the core clock.

18. The method of claim 17, further comprising adjusting the delay with the controller to minimize latency.

19. The method of claim 14, further comprising:
   starting a timer when a packet is received; and
   triggering the core-side read operation when the timer reaches a predetermined time.

20. The method of claim 13, further comprising situating a receive link layer on the link side of the receive buffer.

21. The method of claim 20, wherein receiving comprises receiving SSC modulated input data packets with a single lane link, further comprising:
   detecting packet boundaries with the receive link layer.

22. The method of claim 20, wherein receiving comprises receiving SSC modulated input data packets with a multi-lane link, further comprising:
   aligning bytes of a data packet distributed across lanes of the multi-lane link with the receive link layer; and
   detecting packet boundaries with the receive link layer.

23. The method of claim 20, wherein situating a receive link layer comprises situating the receive link layer to have a link side and a core side, further comprising:
   determining a location of a boundary between a link clock domain and a core clock domain as being between the core side of the link layer and the core side of the receive buffer.

24. The method of claim 13, further comprising determining a location of a boundary between a link clock domain and a core clock domain as being between the link side of the receive buffer and the core side of the receive buffer.

* * * * *